US010684997B2

(12) United States Patent
Do et al.

(10) Patent No.: US 10,684,997 B2
(45) Date of Patent: Jun. 16, 2020

(54) FILE CONSISTENCY ACROSS FILE VERSIONS MAINTAINED BY DIFFERENT SERVICES

(71) Applicant: Microsoft Technology Licensing, LLC, Redmond, WA (US)

(72) Inventors: Tai The Do, Redmond, WA (US); Vijayalakshmi Ramkumar, Bellevue, WA (US); Eric O'Brien, Redmond, WA (US); Apeksha Godiyal, Redmond, WA (US); Alexandre Grigorovitch, Redmond, WA (US); Yisheng Chen, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 15/792,301

(22) Filed: Oct. 24, 2017

(65) Prior Publication Data
US 2019/0121876 A1 Apr. 25, 2019

(51) Int. Cl.
*G06F 16/182* (2019.01)
*G06F 16/14* (2019.01)
*G06F 16/178* (2019.01)
*G06F 16/23* (2019.01)

(52) U.S. Cl.
CPC ........ *G06F 16/1844* (2019.01); *G06F 16/152* (2019.01); *G06F 16/178* (2019.01); *G06F 16/2365* (2019.01)

(58) Field of Classification Search
CPC combination set(s) only.
See application file for complete search history.

(56) References Cited

U.S. PATENT DOCUMENTS

| 7,430,670 | B1* | 9/2008 | Horning | G06F 21/14 |
| | | | | 713/190 |
| 8,090,681 | B2 | 1/2012 | Lukiyanov et al. | |
| 8,495,015 | B2 | 7/2013 | Freedman | |
| 8,595,381 | B2 | 11/2013 | Long | |
| 8,762,327 | B2 | 6/2014 | Van Riel | |
| 9,471,556 | B2 | 10/2016 | Little et al. | |
| 9,575,764 | B1* | 2/2017 | Turner | G06F 9/3844 |

(Continued)

OTHER PUBLICATIONS

Marshall, et al., "Supporting Research Collaboration through Bi-Level File Synchronization", In Proceedings of the 17th ACM international conference on Supporting group work, Oct. 27, 2012, 10 Pages.

(Continued)

*Primary Examiner* — Shyue Jiunn Hwa

(57) ABSTRACT

Non-limiting examples of the present disclosure describe processing operations that achieve file consistency in the presence of a large-scale collaboration service. A mismatch may be determined between hash values associated with two or more versions of a file that is associated with a tenant of a productivity service. Version vector data for different versions of the file may be evaluated. Version vector data may comprise: a session value indicating a session of the productivity service and a version value that indicates a number of changes made by the tenant during the session. A synchronization determination is generated based on an evaluation of the version vector data for the different versions of the file.

20 Claims, 8 Drawing Sheets

(56) References Cited

U.S. PATENT DOCUMENTS

| | | | |
|---|---|---|---|
| 2010/0235285 A1* | 9/2010 | Hoffberg | G06Q 20/401 |
| | | | 705/75 |
| 2014/0280463 A1 | 9/2014 | Hunter et al. | |
| 2015/0278330 A1 | 10/2015 | Hawa et al. | |
| 2016/0110326 A1 | 4/2016 | Ryan et al. | |
| 2016/0378737 A1 | 12/2016 | Keslin et al. | |
| 2016/0381099 A1 | 12/2016 | Keslin et al. | |
| 2019/0124082 A1* | 4/2019 | Mazouchi | H04L 63/0407 |

OTHER PUBLICATIONS

"International Search Report and Written Opinion Issued in PCT Application No. PCT/US2018/049819", dated Dec. 12, 2018, 11 Pages.

Wang, et al., "Diving into Cloud-Based File Synchronization with User Collaboration", In Proceedings of 2016 IEEE/ACM 24th International Symposium on Quality of Service (IWQoS), Jun. 20, 2016, 9 Pages.

* cited by examiner

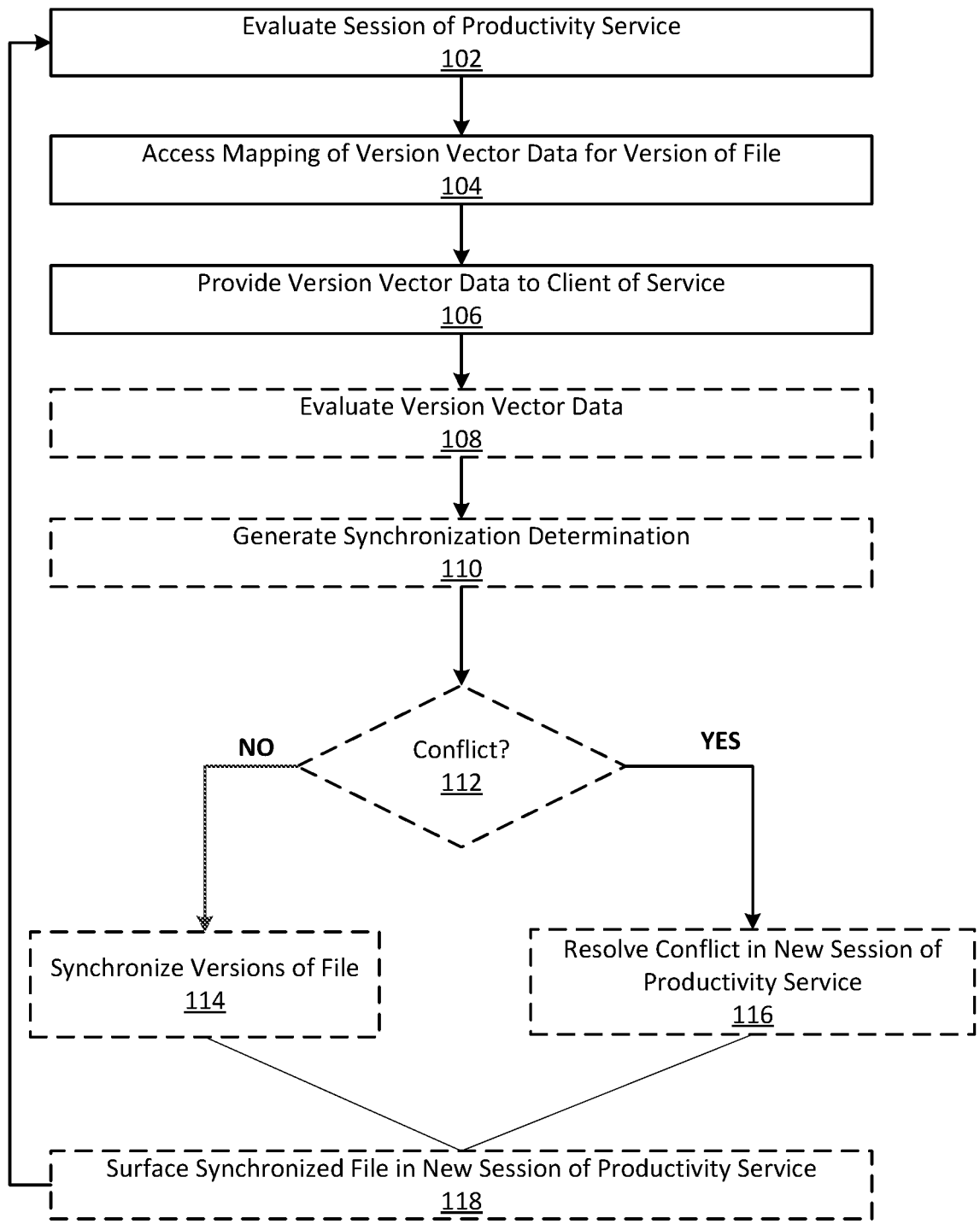

120

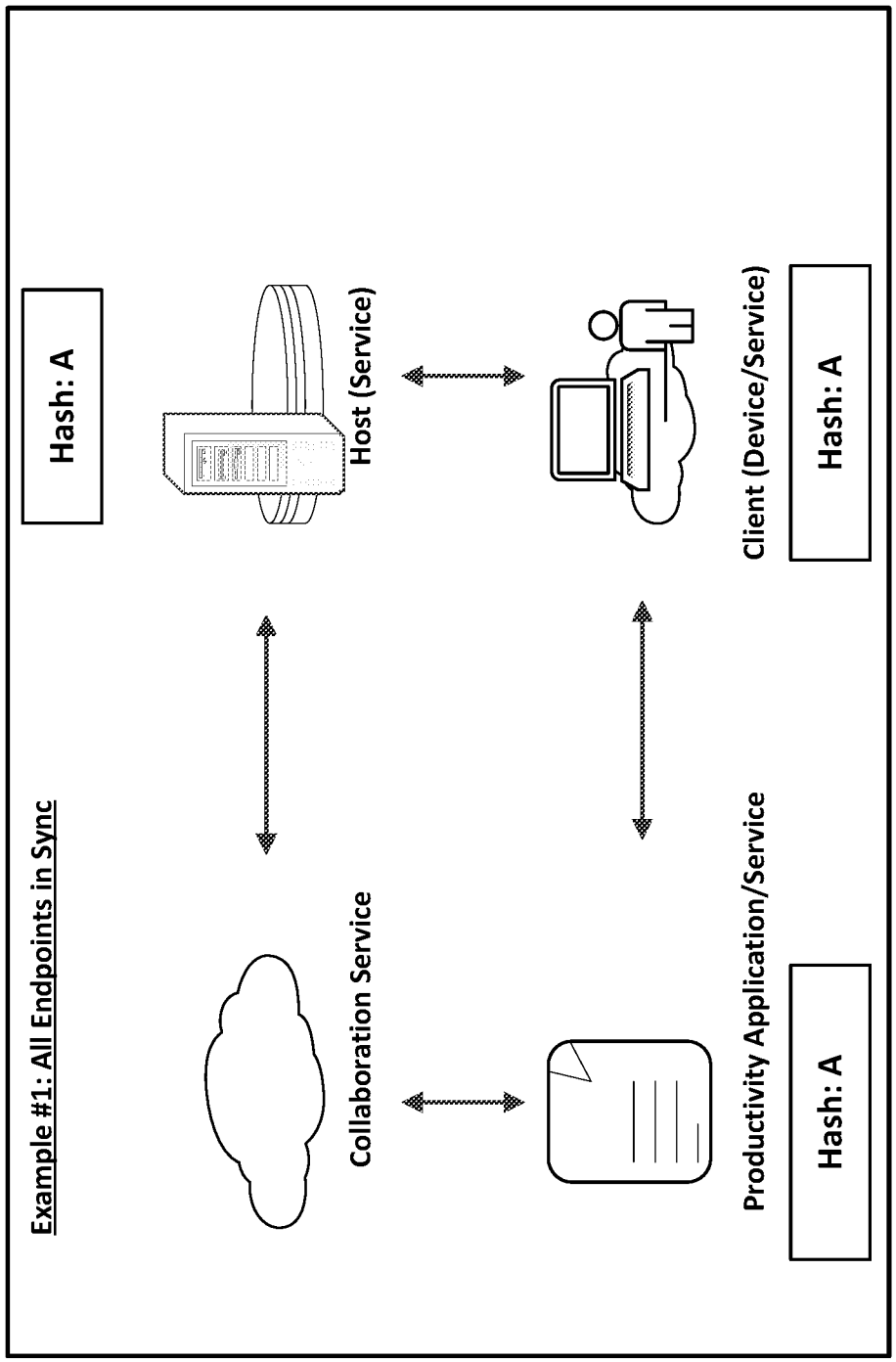

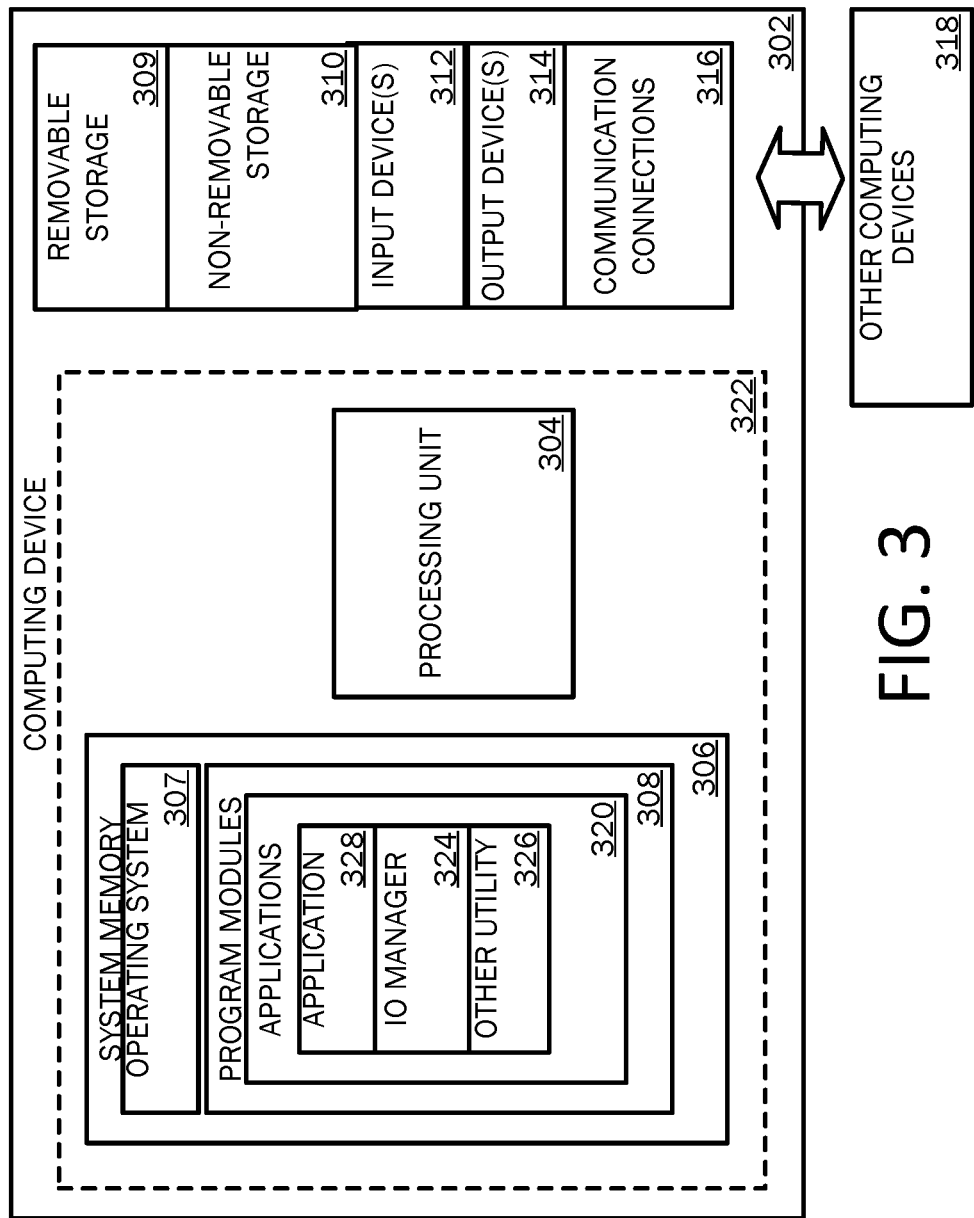

FILE CONSISTENCY ACROSS FILE VERSIONS MAINTAINED BY DIFFERENT SERVICES

BACKGROUND

At any given point in time, applications as services may be managing different versions of a file. For instance, a local version of a file may be saved on a client device and a network version of the file may be maintained by a hosting service. The version of the hosting service may not be perfectly in sync when users are collaborating in real time, yet users expect the local file to: contain what they last saw on close and stay up-to-date with future changes from collaborators. Data loss is not acceptable in any case, no matter how rare that case may be.

To maintain file consistency, services typically use a hash comparison (of the different versions) to determine whether a local file is synced with respect to the server or not. In some configurations, uploads, by a client, are managed through a service and do not go directly to a hosting service. If a file is closed after changes are pushed to the service but before making it to the host, the "Host Hash" will be different and not match the "Local Hash". Moreover, another issue is that different versions of a file may not be byte-wise equivalent, even if content is the same. So even if a client change is persisted to a host, the "Host Hash" and "Local Hash" may not match. As such, additional checks are needed to better manage file consistency between different computing devices in service-based examples.

SUMMARY

Non-limiting examples of the present disclosure describe processing operations that achieve file consistency across file versions maintained by different applications/services. As an example, a collaboration service may be configured to manage file consistency between a plurality of versions of a file that may be maintained by: a productivity service, a file hosting service, and N other number of other versions (e.g. maintained by a client computing device, cache of the productivity service, etc.) among other examples. For example, the collaboration service is configured to manage versions of a file that are generated during a session of a productivity service. Examples described herein provide a fallback to regular conflict detection to resolve synchronization issues when versions of a file are stored across different services. However, processing operations described herein may also be configured a primary method to determine file consistency across different locations and/or services.

In other examples, a client of the productivity service interfaces with an exemplary collaboration service to maintain file consistency between different versions of a digital file. That is, a synchronization determination is made by the client of the productivity service, for example, based on exemplary version vector data received from a collaboration service. A mismatch may be determined between hash values associated with two or more versions of a file that is associated with a tenant of a productivity service. Version vector data for different versions of a digital file may be evaluated, for example, based on a determination of a mismatch between hash values of the different versions of the digital file, among other examples. As an example, a first version of a file may be managed by a client of a productivity service (or client of a hosting service) and a second version of the file may be managed by the file hosting service. The version vector file data may comprise: version vector data for a first version of the file managed by a local client device, version vector data for a second version of the file managed by a file hosting service and version vector data for a third version of the file managed by a productivity service. A synchronization determination is generated based on an evaluation of the version vector data for the different versions of the file.

In one example, the synchronization determination overwrites the first version of the file with the second version of the file based on the evaluation indicating that the session value of the first version of the file and the second version of the file are the same and the version value of the second version of the file is equal to or greater than the version value of the first version of the file. In such an example, the second version of the file is surfaced in the productivity service based on the synchronization determination when the tenant initiates a new session of the productivity service.

In another example, the synchronization determination overwrites the second version of the file with the first version of the file based on the evaluation indicating that the session value of the first version of the file and the second version of the file are the same and the version value of the first version of the file is equal to or greater than the version value of the second version of the file. In such an example, the first version of the file is surfaced in the productivity service based on the synchronization determination when the tenant initiates a new session of the productivity service.

In yet example, the synchronization determination overwrites the first and second versions of the file with the third version of the file, for example, where the third version of the file is maintained locally on a client computing device, a version maintained by a client of the file hosting service, another version maintained by the productivity service (e.g. in a cache of the productivity service, etc.) For instance, an evaluation may indicate that the session values are the same and the version value of the third version of the file is equal to or greater than the version values of the first and second versions of the file. In such an example, the third version of the file is surfaced in the productivity service based on the synchronization determination when the tenant initiates a new session of the productivity service.

As referenced above, examples described herein pertain to managing versions of a file that are generated during a session of a productivity service. In some cases, a version of a file may be edited outside of a session of a productivity service. This may result in a synchronization determination that the file should be placed in a conflict state. For instance, this may occur when hash values of the versions of the file are mismatched and the version vector data for the different versions of the file is invalidated. Examples of an invalidation of the version vector data may occur when session values of the version vector data (of different versions of a file) are mismatched. In such examples, conflict resolution for the file may occur during a subsequently initiated session of a productivity service. For example, a user interface (UI) prompt may be surfaced for the user to resolve the conflict between the different versions. In another example, the client of the productivity service may be configured to detect a version that the user resumes working with (e.g. local copy or copy retrieved from a distributed service) and automatically resolve the synchronization conflict.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1A illustrates an exemplary method related to server-side processing operations for managing file consistency with which aspects of the present disclosure may be practiced.

FIGS. 2A-2B illustrates examples of hash value management for versions of a file that may trigger evaluation of exemplary version vector data by an exemplary collaboration service, with which aspects of the present disclosure may be practiced.

FIG. 3 is a block diagram illustrating an example of a computing device with which aspects of the present disclosure may be practiced.

DETAILED DESCRIPTION

Figure 1B:
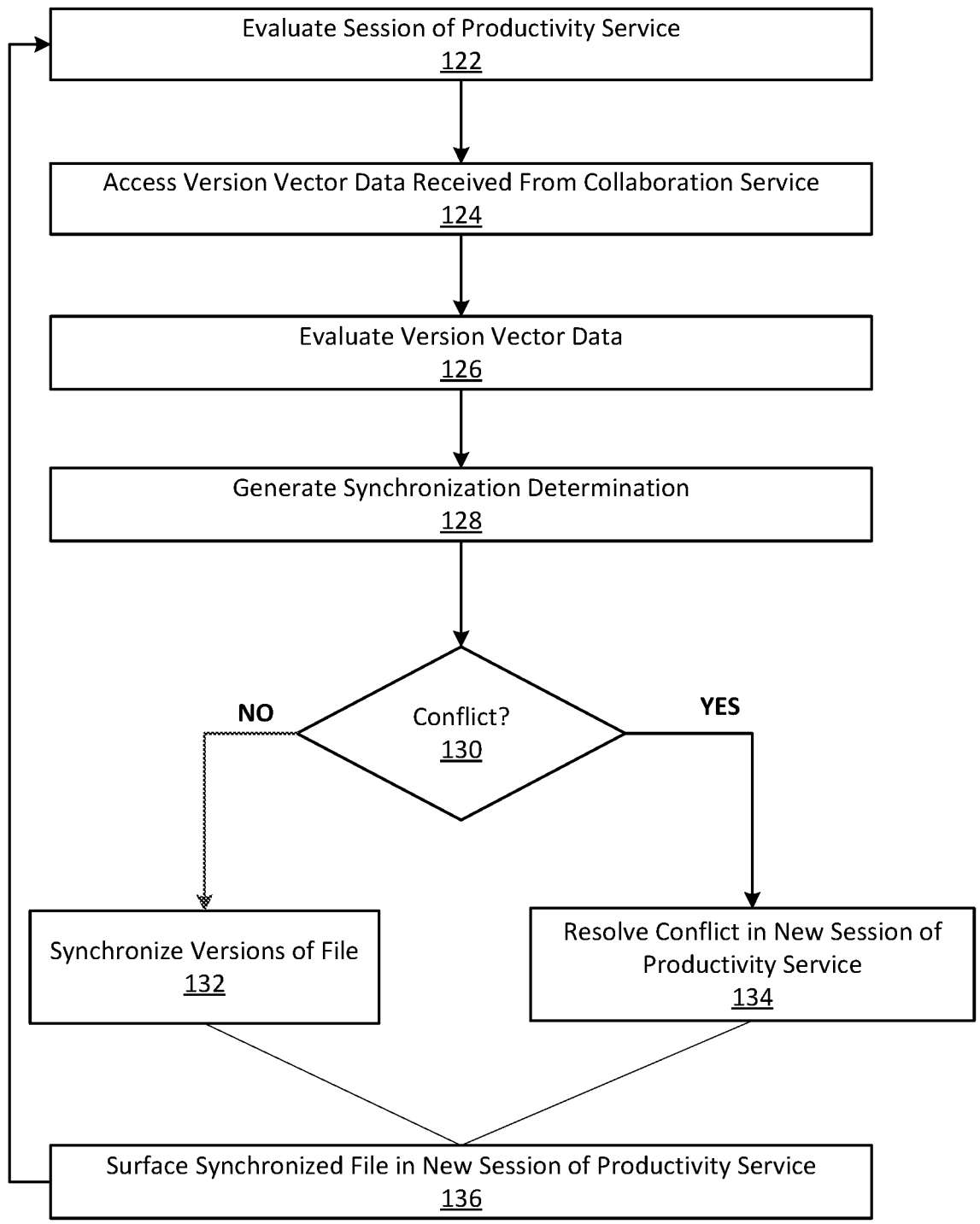
FIG. 1B illustrates an exemplary method related to processing operations that are executed by a client for managing file consistency with which aspects of the present disclosure may be practiced.

Non-limiting examples of the present disclosure describe processing operations that achieve file consistency across file versions maintained by different applications/services. As an example, a collaboration service may interface with a client (of a productivity service, file hosting service, local storage of computing device, etc.) to manage file consistency between a plurality of versions of a file that may be maintained by: a productivity service, a client computing device and a file hosting service, other software components/services, among other examples. For example, the collaboration service (e.g. file synchronization service) is configured to manage versions of a file that are generated during a session of a productivity service. Examples described herein provide a fallback to regular conflict detection to resolve synchronization issues when versions of a file are stored across different services. However, processing operations described herein may also be configured a primary method to determine file consistency across different locations and/or services.

An exemplary collaboration service is configured to manage file consistency between different computing devices and/or services. The collaboration service may utilize an exemplary mapping to track file version data managed by different computing devices and services that interface with a productivity service. File version data may be managed, by the collaboration service, on a per tenant basis (e.g. client by client). For example, a most recent version of a file that is accessed during a session of a productivity service may be saved. That most recent version may be re-surfaced for a tenant during a subsequent session of the productivity service. This may occur through a client of the productivity service obtaining version vector data for different versions of a digital file from the collaboration service. Either the client or the collaboration service may evaluate exemplary version vector data and generate an exemplary synchronization determination. This enables the client of the productivity service to improve processing efficiency to maintain file consistency and reduce false conflicts between different versions of files before a tenant re-accesses a productivity services at a subsequent point in time. Further, processing operations described herein improve the end user experience, for example, when a specific tenant re-initiates a session with a productivity service at a subsequent point in time and can quickly and efficiently resume working on a correct version of a file from a point at which the tenant left off. If there are additional updates made by different collaborative editors (e.g. other tenants associated with a file), such updates may be also added in for a tenant upon initiation of a new session in a productivity service. For instance, the latest version of the file may be surfaced for the tenant (indicating a point where the tenant last left off) and that version may be further supplemented with other updates made by other collaborators.

As referenced above, examples described herein pertain to managing versions of a file that are generated during a session of a productivity service. In some cases, a version of a file may be edited outside of a session of a productivity service. This may result in a synchronization determination that the file should be placed in a conflict state. For instance, this may occur when hash values of the versions of the file are mismatched and the version vector data for the different versions of the file is invalidated. Examples of an invalidation of the version vector data may occur when session values of the version vector data (of different versions of a file) are mismatched. In such examples, conflict resolution for the file may occur during a subsequently initiated session of a productivity service. For example, a user interface (UI) prompt may be surfaced for the user to resolve the conflict between the different versions. In another example, the client of the productivity service may be configured to detect a version that the user resumes working with (e.g. local copy or copy retrieved from a distributed service) and automatically resolve the synchronization conflict.

In some examples, an exemplary client of the productivity service and/or collaboration service may be configured to execute confliction detection checks for hash values and/or validation token comparison for different versions of files before reverting to evaluation of exemplary version vector data. If hash values match and network tokens (for the different versions are valid), then a productivity service may not need to revert to evaluation of version vector data. In examples where one or more of the hash values and network tokens indicate inconsistency, an exemplary productivity service may revert to evaluation of version vector data. However, examples described herein are not so limited to requiring such triggers. Analysis of version vector data may be executed at any point in time. As referenced above, version vector data may be a better way to confirm file consistency because hash values may different even when content of different versions of a file are the same. As such, exemplary evaluation of version vector data may minimize false conflicts between different versions of a file that have the same content (e.g. but different hashes). Further, examples described herein are configured to cause no data loss for files as well as minimize perceived data loss to tenants. Perceived data loss means the tenant does not see the content that is expected on first launch/open, but that data will eventually show up after application/services merge data.

Accordingly, the present disclosure provides a plurality of technical advantages including but not limited to: reducing false conflicts for file synchronization, minimizing actual data loss, minimizing perceived data loss, improved conflict resolution system for maintaining file consistency across different computing devices and services, generation utilization of exemplary version vector data, generation of mapping of version vector data for different versions of files, improved processing efficiency (e.g. reduction in processing cycles, reduction in latency, better management of storage/memory of computing devices) for computing devices that are utilized to maintain file consistency for application/services and improved user interaction including enhanced productivity and user experience for tenants utilizing exemplary productivity services, among other examples.

FIG. 1A illustrates an exemplary method 100 related to server-side processing operations for managing file consistency with which aspects of the present disclosure may be practiced. As referenced above, an exemplary collaboration service may evaluate exemplary version vector data and generate a synchronization determination based on an evaluation of version vector data across different versions of a digital file. Alternatively, the collaboration service may interface with a client of a service (e.g. productivity service, file hosting service, etc.), which may execute evaluation of version vector data. Examples where a client of a service is generating a synchronization determination are provided in method 120 (FIG. 1B).

Figure 4A:
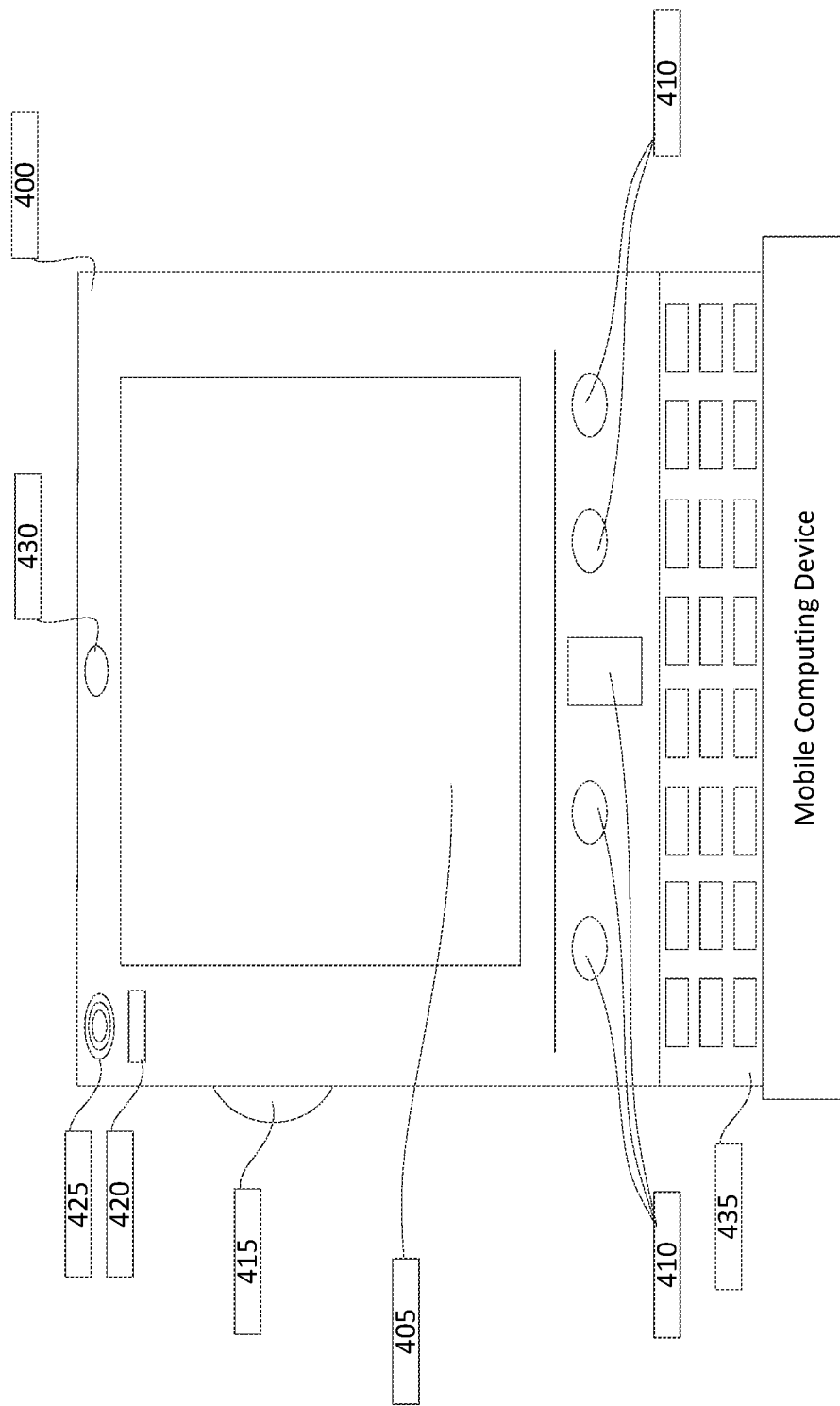
FIGS. 4A and 4B are simplified block diagrams of a mobile computing device with which aspects of the present disclosure may be practiced.
Figure 4B:
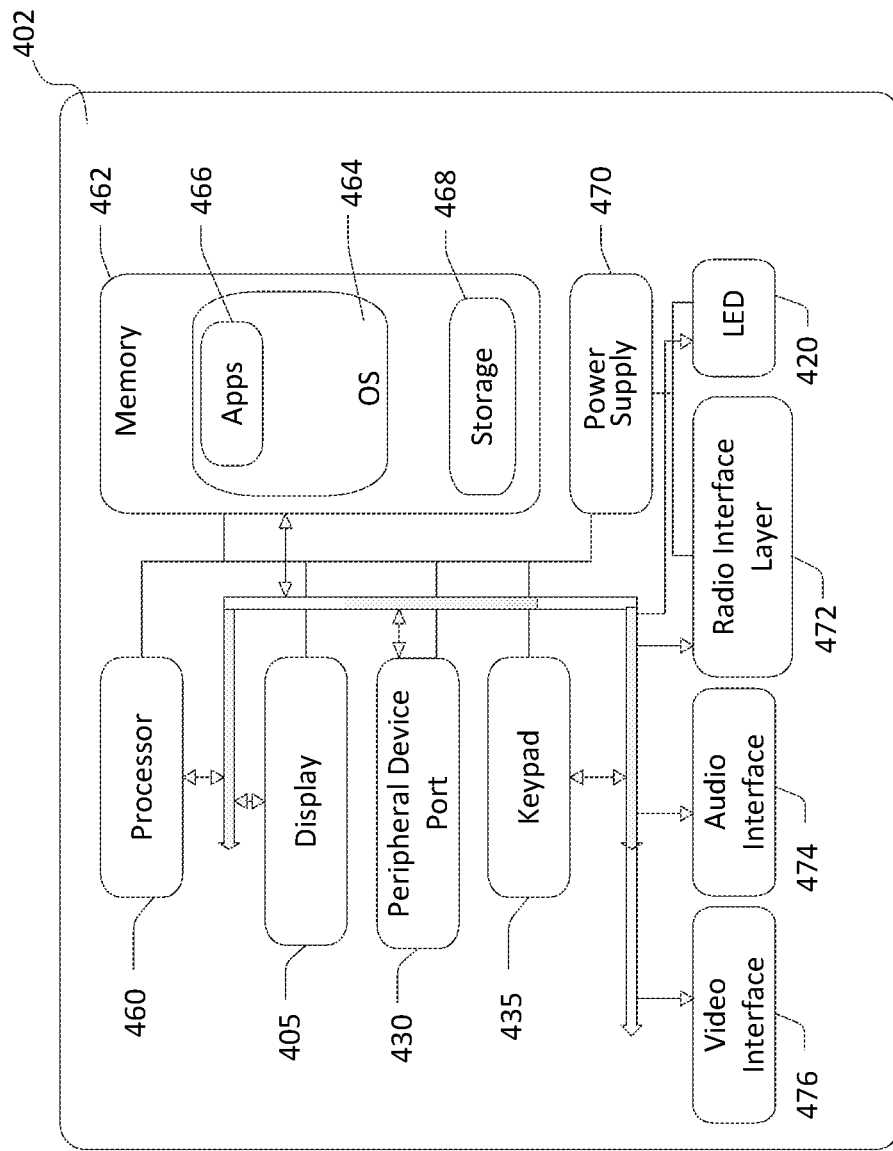
Figure 5:
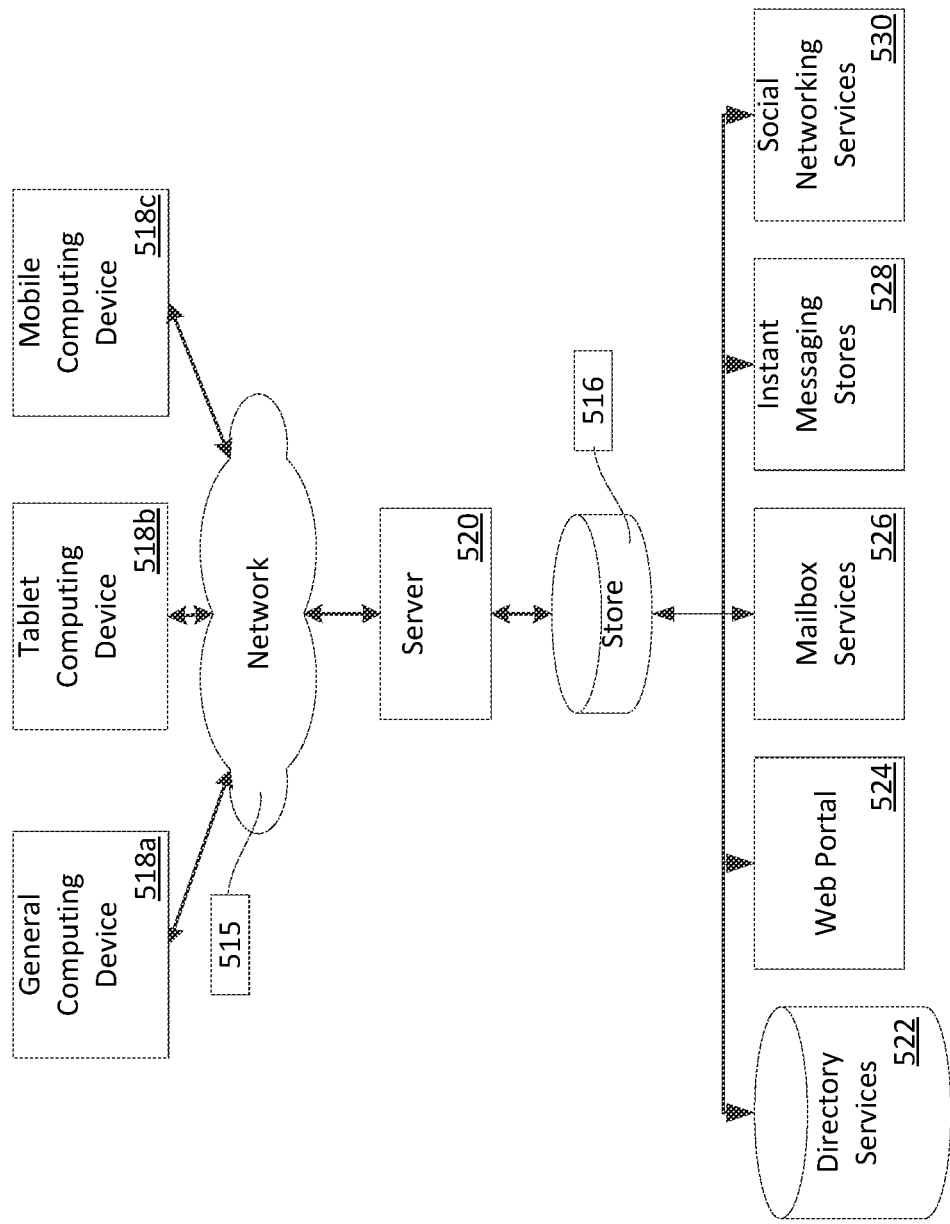
FIG. 5 is a simplified block diagram of a distributed computing system in which aspects of the present disclosure may be practiced.

As an example, method 100 may be executed by an exemplary processing device and/or system such as those shown in FIGS. 3-5. In examples, method 100 may execute on a device comprising at least one processor configured to store and execute operations, programs or instructions or by a software component executing across one or more computing devices. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where an exemplary session of a productivity service is evaluated. An exemplary productivity service may be any service executing as an application, where productivity services comprise but are not limited to: word processing services, spreadsheet services, notes services, presentation services, social networking services, authoring services, education services, email services, messaging services, voice over internet protocol (VoIP) services, data management services including filing hosting services and team collaborative services, among other examples. In at least one example, productivity services may be components of a suite of application/services provided by a platform (e.g. Microsoft® Office365®). A tenant may access a productivity service to manage file content generated through exemplary productivity services. A tenant may be a user account for one or more users of a service, where the tenant accessed the productivity service through a computing device over a network connection.

Processing operation 102 may comprise evaluation of a state of tenant access to the productivity service. For example, a tenant may be involved in an active session of a productivity service or have just exited a session of the productivity service. An exemplary session may comprise access to a digital file through the productivity service, where the tenant is connected to the productivity service over a network connection. A session may correlate to opening/closing of a specific digital file and/or opening/closing the productivity service (or a browser window associated with the productivity service). In alternate examples, a tenant may be editing a digital file outside of a session of the productivity service, for example, where a file is being modified offline. As referenced above, conflict resolution executed by an exemplary collaboration service may manage file consistency between versions of a file differently when changes are occurring outside of a session of a productivity service. In one example, processing operation 102 may execute processing operations to determine that a tenant has exited a session of the productivity service. This may be a trigger to evaluate different versions of a file managed by different computing devices and/or services. However, examples described herein are not so limited, where processing operations described herein may occur at any point in time.

Processing operations may be executed by an exemplary collaboration service that is configured to manage file consistency for different files accessed by tenants of the productivity service. An exemplary collaboration service may be configured to manage file data across a plurality of different productivity application/services. For ease of understanding, examples described herein reference to specific file (where there are multiple versions of the file) accessed by a specific tenant. However, examples described herein can be expanded to evaluate multiple files of multiple tenants without departing from the spirit of the present disclosure.

As an example, a collaboration service may be configured to manage file consistency between a plurality of versions of a file that may be maintained by any of: a productivity service, a file hosting service, and N other number of other versions (e.g. maintained by a client computing device, cache of the productivity service, etc.) among other examples. For example, the collaboration service is configured to manage versions of a file that are generated during a session of a productivity service. An exemplary collaboration service may interface with computing devices and services through software-based connections, for example, achieved through an application programming interface (API), among other examples. For instance, the collaboration service may manage versions of a file managed by: a computing device of a client (e.g. local copy that a tenant is working on), a file hosting service (e.g. distributed database storage for a productivity service) and the productivity service itself, and/or other applications/services, among other examples.

Flow of method 100 may proceed to processing operation 104, where an exemplary mapping of version vector data for versions of a file is accessed. The collaboration service may generate and utilize an exemplary mapping to track file version data for a file that is managed by different computing devices and services that interface with a productivity service. For instance, the collaboration service may be configured to interface with different computing devices and/or services to retrieve data indicative of what version of a file is most current across different devices and services. File version data (e.g. version vector data) may be managed and evaluated, by the collaboration service, on a per tenant basis (e.g. client by client) or may be provided to a client of a service (on a per tenant basis, per file basis, etc.) so that the client can utilize the version vector data to make an exemplary synchronization determination. For example, a most recent version of a file that is accessed during a session of a productivity service may be saved. That most recent version may be re-surfaced for a tenant during a subsequent session of the productivity service. This enables the collaboration service to improve processing efficiency to maintain file consistency and reduce false conflicts between different versions of files before a tenant re-accesses a productivity services at a subsequent point in time. Further, processing operations described herein improve the end user experience, for example, when a specific tenant re-initiates a session with a productivity service at a subsequent point in time and can quickly and efficiently resume working on a correct version of a file from a point at which the tenant left off. If there are additional updates made by different collaborative editors (e.g. other tenants associated with a file), such updates may be also added in for a tenant upon initiation of a new session in a productivity service. For instance, the latest version of the file may be surfaced for the tenant (indicating a point where the tenant last left off) and that version may be further supplemented with other updates made by other collaborators.

An exemplary mapping may organize version vector data for a version of a file in any manner without departing from the spirit of the present disclosure. Version vector data may comprise: a session value indicating a session of the productivity service and a version value that indicates a number of changes made by the tenant during the session. Additional related data may also be correlated with the mapping of the version vector data including but not limited to: hash values for versions of a file, network token data related to the versions of the file, tenant specific data and telemetric data, among other examples. As indicated above, an exemplary mapping may be accessed based on a trigger related to a status of a tenant in a session of a productivity service.

Flow may proceed to processing operation 106, where exemplary data from the accessed mapping is provided to a client of a service. For example, the collaboration service may provide version vector data to a client of a productivity service so that the client can evaluate the version vector data and generated an exemplary synchronization determination. In one example, version vector data is transmitted, to a client, as data object. Format of the data object may vary. In one instance, version vector data is transmitted as a JSON object. Exemplary version vector data may be transmitted to a client via a network connection. In one example, this may occur when a client is active. Requests and responses transmitted between services for requesting/transmitting data are known to one skilled in the field of art.

In alternate examples where an exemplary collaboration service is configured to evaluate version vector data and generate a synchronization determination, flow of method 100 may proceed to processing operation 108. At processing operation 108, version vector data is evaluated. In one instance, the collaboration service may access the mapping of the version vector data based on a determination of a mismatch between hash values associated with two or more versions of a file that is associated with a tenant of a productivity service. As referenced above, different versions of a file, maintained by different computing device and/or services, may each have different hash values. Thus, merely checking hash values of versions of files may result in false conflicts for file data even when the content of different versions of the file is the same. Examples described herein provide a fallback to regular conflict detection to resolve synchronization issues when versions of a file are stored across different services. However, processing operations described herein may also be configured a primary method to determine file consistency across different locations and/ or services. In some examples, an exemplary collaboration service may be configured to execute confliction detection checks for hash values and/or validation token comparison for different versions of files before reverting to evaluation of exemplary version vector data. If hash values match and network tokens (for the different versions are valid), then a collaboration service may not need to revert to evaluation of version vector data. In examples where one or more of the hash values and network tokens indicate inconsistency, an exemplary collaboration service may revert to evaluation of exemplary version vector data as subsequently described.

An exemplary collaboration service may also be configured to execute processing operation 108 based on detection (processing operation 102) of a state of the tenant access to the productivity service. Processing operations for identification of hash values for different file versions and comparison of hash values are known to one skilled in the art.

For instance, in processing operation 108, the collaboration service may utilize the accessed mapping (accessed in processing operation 104) to evaluate the different versions of a file managed across the different devices and/or services. In one example, the version vector data of the different versions is compared. As indicated above, version vector data may comprise: a session value indicating a session of the productivity service and a version value that indicates a number of changes made by the tenant during the session. Processing operation 108 may comprise evaluating the session values across the different versions of the file. In cases where there is a conflict between the session values, the collaboration service may generate a synchronization determination that further conflict resolution is required to remediate inconsistencies across versions of a file. In examples where session values align across different versions of a file, processing operation 108 may comprise evaluation of the version values across the different versions of the file. Evaluation of version vector data may yield a synchronization determination.

At processing operation 110, a synchronization determination is generated based on an evaluation of the version vector data for the different versions of the file. As indicated in the foregoing, alternate examples comprise those where a client of a service evaluates version vector data (received from the collaboration service) and generates an exemplary synchronization determination. An exemplary synchronization determination may be a determination to select and surface a specific version of a file for the tenant to utilize in a subsequent session of the productivity service. In another example, an exemplary synchronization determination may be a determination that further conflict resolution is required to resolve inconsistencies between versions of a file.

In one example, the synchronization determination, generated in processing operation 110, is a determination to overwrite the first version of the file with the second version of the file based on the evaluation indicating that the session value of the first version of the file and the second version of the file are the same and the version value of the second version of the file is equal to or greater than the version value of the first version of the file. In such an example, the second version of the file is surfaced in the productivity service based on the synchronization determination when the tenant initiates a new session of the productivity service.

In another example, the synchronization determination, generated in processing operation 110, is a determination to overwrite the second version of the file with the first version of the file based on the evaluation indicating that the session value of the first version of the file and the second version of the file are the same and the version value of the first version of the file is equal to or greater than the version value of the second version of the file. In such an example, the first version of the file is surfaced in the productivity service based on the synchronization determination when the tenant initiates a new session of the productivity service.

In yet example, the synchronization determination, generated in processing operation 110, is a determination to overwrite the first and second versions of the file with the third version of the file based on the evaluation indicating that the session values are the same and the version value of the third version of the file is equal to or greater than the version values of the first and second versions of the file. In such an example, the third version of the file is surfaced in the productivity service based on the synchronization determination when the tenant initiates a new session of the productivity service.

As referenced above, examples described herein pertain to managing versions of a file that are generated during a session of a productivity service. In some cases, a version of a file may be edited outside of a session of a productivity service. This may result in a synchronization determination that the file should be placed in a conflict state. For instance, this may occur when hash values of the versions of the file are mismatched and the version vector data for the different versions of the file is invalidated. Examples of an invalidation of the version vector data may occur when session values of the version vector data (of different versions of a file) are mismatched. In such examples, conflict resolution for the file may occur during a subsequently initiated session of a productivity service. For example, a user interface (UI) prompt may be surfaced for the user to resolve the conflict between the different versions. In another example, the collaboration service may be configured to detect a version that the user resumes working with (e.g. local copy or copy retrieved from a distributed service) and automatically resolve the synchronization conflict. As such, a synchronization determination may comprise a determination to invalidate version vector data (for one or more versions of a file) as well as generate a conflict resolution determination based on the invalidation. For example, invalidation of version vector data may result in the client of a service requesting subsequent conflict resolution during a new session of the productivity service. In another instance, invalidation of version vector data may result in selection of a specific version of a file over other versions of a file, where that selected file version may be surfaced for the tenant in a new session of the productivity service.

Flow of method 100 may proceed to decision operation 112, where it is determined whether further conflict resolution is required to achieve consistency between different versions of a file. For instance, an exemplary synchronization determination (generated in processing operation 110) may be utilized to determine whether subsequent conflict resolution is required.

In examples where versions of file are to be synchronized without further conflict resolution, flow of decision operation 112 branches NO and method 100 proceeds to processing operation 114. At processing operation 114, the versions of the file are synchronized by the collaboration service. Synchronization (processing operation 114) may comprise validation of a specific version of a file to surface in a new session of the productivity service. An exemplary new session may be re-access to a specific digital file or re-launching of the productivity service.

In examples where further conflict resolution is required to achieve file consistency, flow of decision operation 112 branches YES and method 100 proceeds to processing operation 116. At processing operation 116, a conflict between different versions of a file is resolved in a new session of the productivity service. In one example, a user interface (UI) prompt is surfaced for the tenant to manually resolve conflict. In another example, the collaboration service (in processing operation 116) may be configured to detect a version that the tenant resumes working with (e.g. local copy or copy retrieved from a distributed service) and automatically resolve the synchronization conflict on behalf of the tenant.

In any example, flow of method 100 may proceed to processing operation 118, where a version of the file, that is synchronized across different computing devices and services by the collaboration service, is surfaced in a new session of the productivity service. The collaboration service may be configured to resume tracking of states/versions of the file in association with the new session. Flow of method 100 may return back to processing operation 102, where the new session of the productivity service is evaluated. As referenced above, the synchronized file version may be surfaced for the tenant. That synchronized version may be further updated with additional modifications made by other collaborators of a digital file. Such updates may be identified for the tenant within the file. However, the point where the tenant last left off (reflecting the most recent updates by the tenant) may be maintained through file synchronization operations.

The collaboration service may also be configured to generate and manage exemplary mappings of version vector data. An exemplary mapping is generated from the data received from different devices and services. For example, exemplary service clients may provide the collaboration service with data to reconcile the file on disk (e.g. local version of the file) with the version managed by the file hosting service and the version managed by a cache of the productivity service. On a save option, the productivity service is configured to provide enough information for a local client to continue syncing with the file hosting, without running into a false conflict, when the productivity service is closed. A generated mapping may be stored on storage associated with one or more computing devices. An exemplary mapping is accessible at any point in time for the collaboration service to resolve file inconsistency. Additionally, data associated with that mapping may be updated periodically (e.g. in real-time).

Generation of version vector data may also be managed by an exemplary collaboration service. For example, the collaboration service may interface with other computing devices and services, as referenced above, to have the computing devices and services provide version vector data for versions of a file maintained by specific computing devices and/or services. Computing devices and/or services may opportunistically execute disk saves to maintain versions of a file that are most up to date. Still, there may be inconsistency between different version of a file. Opportunistic save may be configured to work on a trigger basis (e.g. special UI events like idle, focus, loss, close, save, etc.) and/or on a timer (e.g. auto-save). Version vector data may be transmitted to the collaboration service in any format. In one example, the version vector data is provided in a JSON format that comprises data fields similar those described in the foregoing.

FIG. 1B illustrates an exemplary method 120 related to processing operations that are executed by a client for managing file consistency with which aspects of the present disclosure may be practiced. As an example, method 120 may be executed by an exemplary processing device and/or system such as those shown in FIGS. 3-5. In examples, method 120 may execute on a device comprising at least one processor configured to store and execute operations, programs or instructions or be a software component (e.g. software client) that is operating on a computing device. Operations performed in method 120 may correspond to operations executed by a system and/or service that execute computer programs, application programming interfaces (APIs), neural networks or machine-learning processing, among other examples. As an example, processing operations executed in method 120 may be performed by one or more hardware components. In another example, processing operations executed in method 120 may be performed by one or more software components. In some examples, processing operations described in method 120 may be executed by one or more applications/services associated with a web service that has access to a plurality of application/services, devices, knowledge resources, etc. Processing operations described in method 120 may be implemented by one or more components connected over a distributed network.

Method 120 begins at processing operation 122, where an exemplary session of a productivity service is evaluated. Examples of evaluation of an exemplary productivity service have been provided in the foregoing description of method 100 (FIG. 1A). As an example, an exemplary client (e.g. software component), executing on a client computing device, may be accessing an exemplary productivity service, for example, via a network connection. As described in the foregoing, different versions of files may be maintained relative to a digital file of a tenant of the productivity service.

Processing operations may be executed by an exemplary client of an application/service (e.g. productivity service) that is configured to manage file consistency for different files accessed by tenants of the productivity service. For ease of understanding, examples described herein reference to specific file (where there are multiple versions of the file) accessed by a specific tenant. However, examples described herein can be expanded to evaluate multiple files of multiple tenants without departing from the spirit of the present disclosure.

As an example, a client of a productivity service may be configured to manage file consistency between a plurality of versions of a file that may be maintained by: a productivity service and/or locally on a computing device executing the client and a file hosting service, among other examples. For example, the client of a productivity service is configured to manage versions of a file that are generated during a session of a productivity service. An exemplary client of a productivity service may interface with computing devices (e.g. executing software client) and services through software-based connections, for example, achieved through an application programming interface (API), among other examples.

Flow of method 120 may proceed to processing operation 124, where version vector data for different versions of a digital file is accessed. For instance, the version vector data may be received from an exemplary collaboration service. In one example, the client of the productivity service may access the version vector data based a tenant accessing the productivity service. However, examples are not so limited. In another instance, version vector data is received from a synchronization service when the tenant exits a digital document of the productivity service (or is logged out from the productivity service, idle for a predetermined time period, etc.) In further examples, an exemplary client of the productivity service may access the version vector data based on determination of a mismatch between hash values associated with two or more versions of a file that is associated with a tenant of a productivity service. As referenced above, different versions of a file, maintained by different computing device and/or services, may each have different hash values. Thus, merely checking hash values of versions of files may result in false conflicts for file data even when the content of different versions of the file is the same. Examples described herein provide a fallback to regular conflict detection to resolve synchronization issues when versions of a file are stored across different services. However, processing operations described herein may also be configured a primary method to determine file consistency across different locations and/or services. In some examples, an exemplary client of the productivity service may be configured to execute conflict detection checks for hash values and/or validation token comparison for different versions of files before reverting to evaluation of exemplary version vector data. If hash values match and network tokens (for the different versions are valid), then the client of the productivity service may not need to revert to evaluation of version vector data. In examples where one or more of the hash values and network tokens indicate inconsistency, an exemplary client may revert to evaluation of exemplary version vector data as subsequently described. Examples of version vector data have been provided in the foregoing description of method 100 (FIG. 1). Exemplary version vector file data may comprise: version vector data for a first version of the file managed by a client of a productivity service and version vector data for a second version of the file managed by a file hosting service, version vector data for a third version of the file managed by a productivity service and N more versions managed by different computing resources, among other examples.

Flow of method 120 proceeds to processing operation 126, where exemplary version vector data for digital file is evaluated. As identified above, version vector data for different versions of a digital file may be evaluated based on one of the triggers identified in the foregoing description including based on determination of a mismatch between hash values associated with two or more versions of a file that is associated with a tenant of a productivity service, token validation issues, etc. In one example, the version vector data of the different versions is compared. As indicated above, version vector data may comprise: a session value indicating a session of the productivity service and a version value that indicates a number of changes made by the tenant during the session. Processing operation 126 may comprise evaluating the session values across the different versions of the file. In cases where there is a conflict between the session values, the client of the productivity service may generate a synchronization determination that further conflict resolution is required to remediate inconsistencies across versions of a file. In examples where session values align across different versions of a file, processing operation 126 may comprise evaluation of the version values across the different versions of the file. Evaluation of version vector data may yield a synchronization determination.

At processing operation 128, a synchronization determination is generated based on an evaluation of the version vector data for the different versions of the file. An exemplary synchronization determination may be a determination to select and surface a specific version of a file for the tenant to utilize in a subsequent session of the productivity service. In another example, an exemplary synchronization determination may be a determination that further conflict resolution is required to resolve inconsistencies between versions of a file.

In one example, the synchronization determination, generated in processing operation 128, is a determination to overwrite the first version of the file with the second version of the file based on the evaluation indicating that the session value of the first version of the file and the second version of the file are the same and the version value of the second version of the file is equal to or greater than the version value of the first version of the file. In such an example, the second version of the file is surfaced in the productivity service based on the synchronization determination when the tenant initiates a new session of the productivity service.

In another example, the synchronization determination, generated in processing operation 128, is a determination to overwrite the second version of the file with the first version of the file based on the evaluation indicating that the session value of the first version of the file and the second version of the file are the same and the version value of the first version of the file is equal to or greater than the version value of the second version of the file. In such an example, the first version of the file is surfaced in the productivity service based on the synchronization determination when the tenant initiates a new session of the productivity service.

In yet example, the synchronization determination, generated in processing operation 128, is a determination to overwrite the first and second versions of the file with the third version of the file based on the evaluation indicating that the session values are the same and the version value of the third version of the file is equal to or greater than the version values of the first and second versions of the file. In such an example, the third version of the file is surfaced in the productivity service based on the synchronization determination when the tenant initiates a new session of the productivity service.

As referenced above, examples described herein pertain to managing versions of a file that are generated during a session of a productivity service. In some cases, a version of a file may be edited outside of a session of a productivity service. This may result in a synchronization determination that the file should be placed in a conflict state. For instance, this may occur when hash values of the versions of the file are mismatched and the version vector data for the different versions of the file is invalidated. Examples of an invalidation of the version vector data may occur when session values of the version vector data (of different versions of a file) are mismatched. In such examples, conflict resolution for the file may occur during a subsequently initiated session of a productivity service. For example, a user interface (UI) prompt may be surfaced for the user to resolve the conflict between the different versions. In another example, the client of the productivity service may be configured to detect a version that the user resumes working with (e.g. local copy or copy retrieved from a distributed service) and automatically resolve the synchronization conflict. As such, a synchronization determination may comprise a determination to invalidate version vector data (for one or more versions of a file) as well as generate a conflict resolution determination based on the invalidation. For example, invalidation of version vector data may result in the client of the productivity service requesting subsequent conflict resolution during a new session of the productivity service. In another instance, invalidation of version vector data may result in selection of a specific version of a file over other versions of a file, where that selected file version may be surfaced for the tenant in a new session of the productivity service.

Flow of method 100 may proceed to decision operation 130, where it is determined whether further conflict resolution is required to achieve consistency between different versions of a file. For instance, an exemplary synchronization determination (generated in processing operation 128) may be utilized to determine whether subsequent conflict resolution is required.

In examples where versions of file are to be synchronized without further conflict resolution, flow of decision operation 130 branches NO and method 120 proceeds to processing operation 132. At processing operation 132, the versions of the file are synchronized. Synchronization (processing operation 132) may comprise validation of a specific version of a file to surface in a new session of the productivity service. An exemplary new session may be re-access to a specific digital file or re-launching of the productivity service.

In examples where further conflict resolution is required to achieve file consistency, flow of decision operation 130 branches YES and method 120 proceeds to processing operation 134. At processing operation 134, a conflict between different versions of a file is resolved in a new session of the productivity service. In one example, a user interface (UI) prompt is surfaced for the tenant to manually resolve conflict. In another example, the client of the productivity service may be configured to detect a version that the tenant resumes working with (e.g. local copy or copy retrieved from a distributed service) and automatically resolve the synchronization conflict on behalf of the tenant.

In any example, flow of method 120 may proceed to processing operation 136, where a version of the file, that is synchronized across different computing devices and services by the client of the productivity service, is surfaced in a new session of the productivity service. An exemplary collaboration service may be configured to resume tracking of states/versions of the file in association with the new session. Flow of method 120 may return back to processing operation 122, where the new session of the productivity service is evaluated. As referenced above, the synchronized file version may be surfaced for the tenant. That synchronized version may be further updated with additional modifications made by other collaborators of a digital file. Such updates may be identified for the tenant within the file. However, the point where the tenant last left off (reflecting the most recent updates by the tenant) may be maintained through file synchronization operations.

Figure 2B:
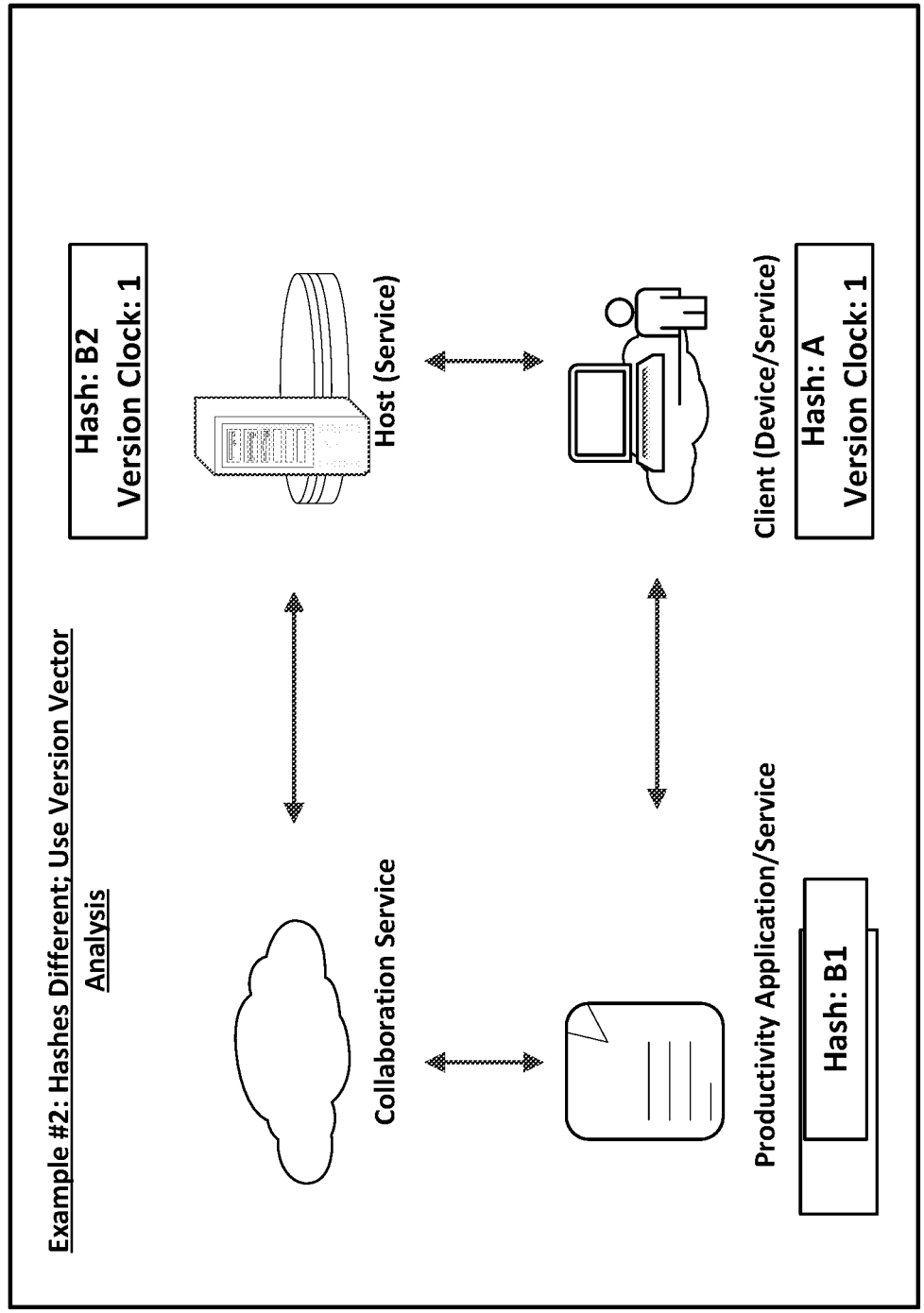

FIGS. 2A-2B illustrates examples of hash value management for versions of a file that may trigger evaluation of exemplary version vector data by a collaboration service, with which aspects of the present disclosure may be practiced. Examples illustrated in FIGS. 2A and 2B indicate an example of a trigger for initiation of evaluation of exemplary version vector data to manage file consistency, where related processing operations are described in the foregoing description of method 100 (FIG. 1). For example, an exemplary collaboration service may utilize a trigger to initiate analysis of version vector data. As referenced above, another trigger may pertain to evaluation of network token data associated with different versions of a file. In alternate examples, analysis of version vector data may be a primary option for evaluation of consistency between different versions of files.

Process flow 200 (shown in FIG. 2A) illustrates a technical example where hash values of exemplary endpoints are in sync. For example, an exemplary collaboration service may interface with other computing devices and services as referenced in the foregoing description. For instance, a version of a file may be managed by a client (e.g. local computing device of tenant or distributed version associated with a tenant), a version of the file may be managed by a host (e.g. file hosting service) and a version of a file may be managed by a productivity application/service (e.g. cached). In the example show in process flow 200, hash values (e.g. "Hash A") for a version of the file maintained by the different endpoints are determined to be the same. Thus, a determination may be made that the file is synchronized across the different endpoints. In such an example, evaluation of exemplary version vector data may not be required.

Process flow 210 (shown in FIG. 2B) illustrates a technical example where hash values of exemplary endpoints are different. This may be a trigger for version vector analysis across the different endpoints as described in method 100 (FIG. 1). As can be seen in process flow 210, the hash values of the different endpoints are determined to be different (e.g. Hash A, Hash B1, Hash B2). An exemplary collaboration service may then evaluate the version vector data for versions managed by the various endpoints. For instance, in the example shown in process flow 210, the version value (e.g. "Version Clock") indicates that the version managed by the host and the version managed by client is the same. This data can be utilized by the collaboration service to generate an exemplary synchronization determination, for example, that the versions of the files are consistent (and either can be utilized for surfacing in a subsequent session of the productivity service). Alternate examples of synchronization determinations related to version vector analysis are described in the foregoing description of method 100.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for maintaining file consistency between different versions of a file as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for maintaining file consistency between different versions of a file as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for maintaining file consistency between different versions of a file as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    determining a mismatch between hash values that comprise a first hash value identifying a first version of a file maintained by a client device and a second hash value identifying a second version of the file maintained by a productivity service that provides access to the file for one or more users over a network connection of a computing device;
    evaluating, based on a determination of the mismatch between the hash values, version vector data for the first version of the file and the second version of the file, wherein the version vector data comprises: a session value indicating a session of the productivity service and a version value that indicates a numerical number of changes made to content of a file of the productivity service by a tenant during the session; and
    generating a synchronization determination based on an evaluation of the version vector data for the first version of the file and the second version of the file.

2. The method of claim 1, wherein the synchronization determination automatically overwrites the first version of the file with the second version of the file based on the evaluation indicating that the session value of the first version of the file and the second version of the file are the same and the version value of the second version of the file is equal to or greater than the version value of the first version of the file.

3. The method of claim 2, further comprising: surfacing the second version of the file in the productivity service based on the synchronization determination when the tenant initiates a new session of the productivity service.

4. The method of claim 1, wherein the synchronization determination automatically overwrites the second version of the file with the first version of the file based on the evaluation indicating that the session value of the first version of the file and the second version of the file are the same and the version value of the first version of the file is equal to or greater than the version value of the second version of the file.

5. The method of claim 4, further comprising: surfacing the first version of the file in the productivity service based on the synchronization determination when the tenant initiates a new session of the productivity service.

6. The method of claim 1, wherein the client device executes the determining of the mismatch between the hash values.

7. The method of claim 1, wherein the hash values further comprise a third hash value identifying a third version of the file maintained by a file hosting service, and wherein the determining of the mismatch between the hash values comprises determining a difference between the first hash value, the second hash value and the third hash value.

8. A system comprising:
 at least one processor; and
 a memory, operatively connected with the at least one processor, storing computer-executable instructions that, when executed by the at least one processor, causes the at least one processor to execute a method that comprises:
  determining a mismatch between hash values that comprise a first hash value identifying a first version of a file maintained by a client device and a second hash value identifying a second version of the file maintained by a productivity service that provides access to the file for one or more users over a network connection of the system;
  evaluating, based on a determination of the mismatch between the hash values, version vector data for the first version of the file and the second version of the file, wherein the version vector data comprises: a session value indicating a session of the productivity service and a version value that indicates a numerical number of changes made to content of a file of the productivity service by a tenant during the session; and
  generating a synchronization determination based on an evaluation of the version vector data for the first version of the file and the second version of the file.

9. The system of claim 8, wherein the synchronization determination automatically overwrites the first version of the file with the second version of the file based on the evaluation indicating that the session value of the first version of the file and the second version of the file are the same and the version value of the second version of the file is equal to or greater than the version value of the first version of the file.

10. The system of claim 9, wherein the method, executed by the at least one processor, further comprises: surfacing the second version of the file in the productivity service based on the synchronization determination when the tenant initiates a new session of the productivity service.

11. The system of claim 8, wherein the synchronization determination automatically overwrites the second version of the file with the first version of the file based on the evaluation indicating that the session value of the first version of the file and the second version of the file are the same and the version value of the first version of the file is equal to or greater than the version value of the second version of the file.

12. The system of claim 11, the method, executed by the at least one processor, further comprises: surfacing the first version of the file in the productivity service based on the synchronization determination when the tenant initiates a new session of the productivity service.

13. The system of claim 8, wherein the system is the client device that executes the determining of the mismatch between the hash values.

14. The system of claim 8, wherein the hash values further comprise a third hash value identifying a third version of the file maintained by a file hosting service, and wherein the determining of the mismatch between the hash values comprises determining a difference between the first hash value, the second hash value and the third hash value.

15. A computer-readable storage medium storing computer-executable instructions that, when executed by at least one processor, causes the at least one processor to execute a method comprising:
 determining a mismatch between hash values that comprise a first hash value identifying a first version of a file maintained by a client device and a second hash value identifying a second version of the file maintained by a productivity service that provides access to the file for one or more users over a network connection of a computing device;
 evaluating, based on a determination of the mismatch between the hash values, version vector data for the first version of the file and the second version of the file, wherein the version vector data comprises: a session value indicating a session of the productivity service and a version value that indicates a numerical number of changes made to content of a file of the productivity service by a tenant during the session; and
 generating a synchronization determination based on an evaluation of the version vector data for the first version of the file and the second version of the file.

16. The computer-readable storage medium of claim 15, wherein the synchronization determination automatically overwrites the first version of the file with the second version of the file based on the evaluation indicating that the session value of the first version of the file and the second version of the file are the same and the version value of the second version of the file is equal to or greater than the version value of the first version of the file.

17. The computer-readable storage medium of claim 16, wherein the executed method further comprising: surfacing the second version of the file in the productivity service based on the synchronization determination when the tenant initiates a new session of the productivity service.

18. The computer-readable storage medium of claim 15, wherein the synchronization determination automatically overwrites the second version of the file with the first version of the file based on the evaluation indicating that the session value of the first version of the file and the second version of the file are the same and the version value of the first version of the file is equal to or greater than the version value of the second version of the file, and wherein the executed method further comprising: surfacing the first version of the file in the productivity service based on the synchronization determination when the tenant initiates a new session of the productivity service.

19. The computer-readable storage medium of claim 15, wherein the at least one processor is a component of the client device that executes the determining of the mismatch between the hash values.

20. The computer-readable storage medium of claim 15, wherein the hash values further comprise a third hash value identifying a third version of the file maintained by a file hosting service, and wherein the determining of the mismatch between the hash values comprises determining a difference between the first hash value, the second hash value and the third hash value.

* * * * *